Sept. 3, 1935.                C. A. CAMPBELL                2,013,031
                                 AIR BRAKE
                           Filed July 27, 1932            2 Sheets-Sheet 2

Inventor
Charles A. Campbell
Attorneys

Patented Sept. 3, 1935

2,013,031

UNITED STATES PATENT OFFICE 2,013,031

AIR BRAKE

Charles A. Campbell, Watertown, N. Y., assignor to The New York Air Brake Company, a corporation of New Jersey Application July 27, 1932, Serial No. 625,094

3 Claims. (Cl. 303—40)

This invention relates to air brakes, and particularly to distributing valves now used to control the engine and tender brakes.

The practice is to use a single distributing valve to control the engine and tender brakes, thus permitting the elimination of a number of triple valves and auxiliary reservoirs, and securing a number of incidental advantages which are too well known to require statement.

The distributing valve is made up of two units, the first known as the equalizing portion, and the second known as the application portion. The equalizing portion is operated by the pressure differential between brake pipe pressure and the pressure in what is known as the pressure chamber. The pressure chamber is the analogue of an auxiliary reservoir.

In making an application, the equalizing portion establishes a definite pressure in the application cylinder. The pressure so established in the application cylinder does not act directly in the brake cylinders, but reacts against the application piston to actuate admission and exhaust valves which control brake cylinder pressure.

The application portion thus is a sort of pressure maintaining valve which functions in response to pressures established in the application cylinder by the equalizing portion.

In the 6E distributing valve, here discussed as typical of various similar valves, the exhaust valve is of the slide type, and is actuated through a lost motion connection by the application piston. The admission valve is also of the slide type, but is positively connected with the application piston by a so-called drive pin, and hence partakes of all the movements of the application piston.

The application piston moves in response to the differential between brake cylinder pressure and application cylinder pressure, and the admission slide valve is interposed between main reservoir pressure and brake cylinder pressure so that the valve is urged to its seat by the preponderance of main reservoir pressure over brake cylinder pressure. It follows that when brake cylinder pressure is low the admission slide valve is most heavily held to its seat, and at such time the effective differential available to move the application piston in a releasing direction is low. Consequently, unless the admission slide valve be kept clean and well lubricated, the slide valve is apt to stick in lap position when brake cylinder pressure is low, and thus prevent complete release of the brakes on the locomotive and tender. This difficulty has long been encountered and many efforts have been made to correct it, since it causes heating and loosening of locomotive tires, and involves serious risks and delay in the movement of trains.

The present invention provides a simple conversion of existing distributing valves, of which the 6E valve is a typical example. The conversion will eliminate the difficulty above enumerated, and will also permit, without substantial increase in the over-all dimensions of the valve, the addition of strainer structure between the main reservoir and the admission slide valve chamber. The changes are all confined to the application portion and are such that existing valves can be converted inexpensively.

The preferred embodiment of the invention will now be described in connection with the accompanying drawings, in which—

Figure 1:
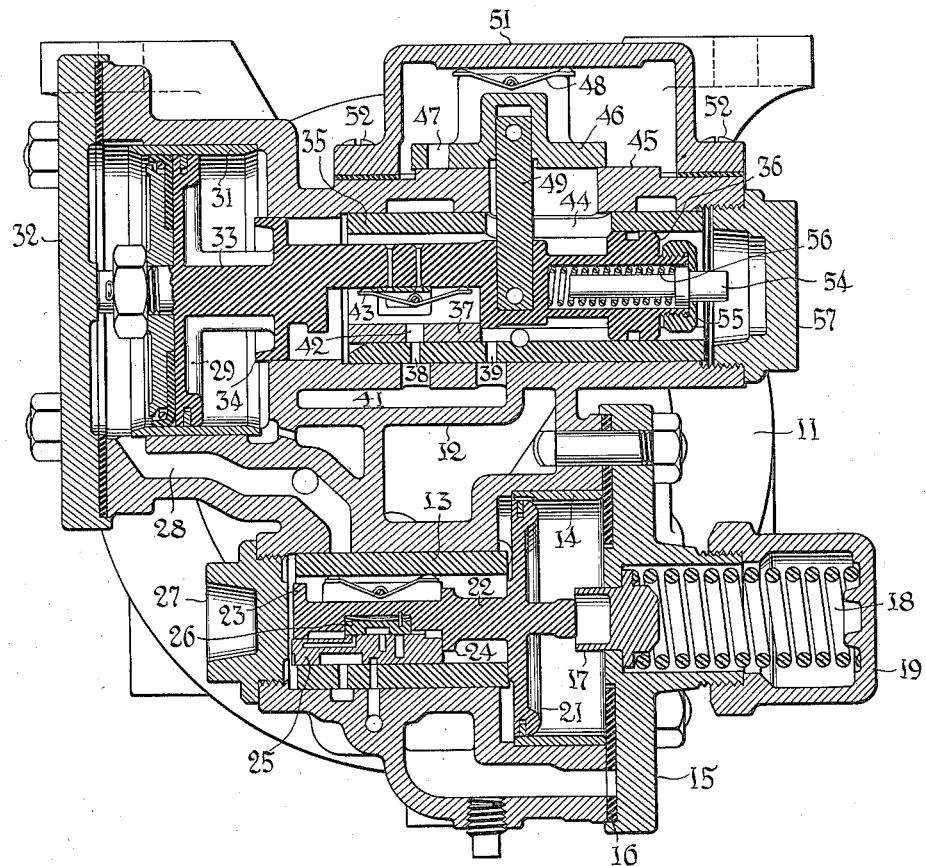
Fig. 1 is a vertical axial section through the equalizing portion and application portion of a 6E distributing valve as heretofore constructed.

Referring first to Fig. 1, the present construction will be described.

The ordinary double chamber reservoir used with the ET equipment, is indicated at 11. This reservoir is subdivided into two isolated volumes, the larger of which serves as the pressure chamber (equalizing reservoir) of the equalizing portion, and the smaller of which serves as the application chamber. Bolted to the head of the double chamber reservoir 11 is a body casting 12 which houses the cylinder and valve chamber of the equalizing portion, and the cylinder and valve chamber of the application portion.

In the lower portion of the body 12 is the slide valve chamber of the equalizing portion, and this is provided with a valve chamber bushing 13. Axially alined with this chamber is the cylinder which is provided with a cylinder bushing 14. The open end of the cylinder is closed by a front cap 15 which is sealed by means of a gasket 16, the gasket projecting radially inward far enough to serve as a seat for the equalizing piston when the latter is in emergency position. The graduating stop 17 is guided in the head 15 and is yieldingly supported by a coil graduating spring 18, whose outer end is sustained by the spring cup 19 threaded on to a projection of the front cap 15.

The equalizing piston 21 works in the bushing 14 and controls a charging groove of conventional form clearly shown in the drawings. The piston 21 has a stem 22 which is guided at its inner end by a spider 23 which works in the bushing 13. The stem 22 carries a collar 24, and between the spider 23 and collar 24 a slide valve 25 is mounted so as to have limited lost motion relatively to the piston. A graduating valve 26 is closely confined in a notch in the stem 22 and works on a seat formed on the upper face of the slide valve 25. The slide valve 25 in turn coacts with a seat formed in the lower portion of the bushing 13. The inner end of the slide valve chamber is closed by a screw plug 27.

The slide valve seat, slide valve, and graduating valve are ported according to standard practice, and the porting need not be set forth in detail as it does not involve the present invention. It will suffice to say that the space on the outer (right hand) side of piston 21, is subject to brake pipe pressure. The space to the left of this piston, including the space within the valve chamber bushing 13, is connected to the pressure chamber in reservoir 11.

In release position the slide valve serves to exhaust the application cylinder. The pressure chamber is charged from the brake pipe by way of the charging groove. In application positions the exhaust from the application cylinder is cut off, the charging groove is closed, and the slide valve is positioned to admit air from the pressure chamber to the application cylinder to develop in the application cylinder a pressure which rises as pressure chamber pressure falls. The flow to the application cylinder is terminated by shifting of the equalizing piston when chamber pressure falls to or slightly below equalization with brake pipe pressure.

The parts numbered 13 to 27 thus function essentially as a triple valve to establish in the application cylinder a pressure which corresponds to the desired brake cylinder pressure.

The pressure so established in the application cylinder is communicated through port 28 to the space on the outer (left hand) side of the application piston 29. This piston works in a cylinder bushing 31 and in order to prevent any loss of application cylinder pressure by leakage past the piston, the piston is provided both with a snap ring and a cup leather. This is standard practice and is fully disclosed in the drawings.

The cylinder space on the outer side of piston 29 is closed by a removable cap 32. The piston has a stem 33 which carries the usual baffle 34 working in the bore of the slide valve chamber. To the right of the baffle 34 the side valve chamber is provided with a valve chamber bushing 35 in which the inner end of the stem 33 is guided by means of a spider or head 36. This is formed with spiral grooves to prevent the spider from acting as a piston.

In its lower portion the bushing 35 is formed with a seat for the exhaust valve 37. In this seat are formed two exhaust ports 38 and 39, both of which lead to the atmospheric exhaust passage 41. The valve 37 has a through port 42, which in release position registers with ports 38. In this position the valve 37 exposes port 39. The valve 37 is urged to its seat by a spring 43 which reacts against a portion of the stem 33. The valve has lost motion relatively to stem 33, the valve being mounted in a notch which is formed in the stem and is longer than the valve. The slot 44 is cut through the upper portion of the bushing 35 and body 12 and terminates in a slide valve seat 45 for the inlet slide valve 46. The slide valve 46 is provided with an admission port 47, and when the piston 29 moves inward (to the right) far enough port 47 opens into slot 44.

Figure 3:
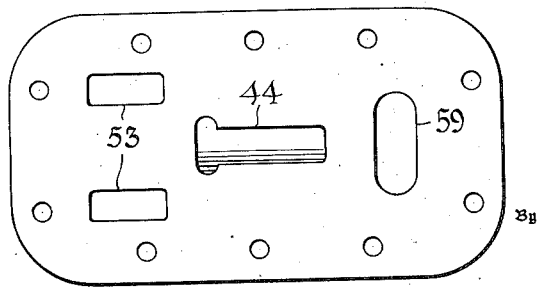
Fig. 3 is a plan view of the top of the valve housing after the inlet slide valve seat has been machined off.

The valve 46 is held to its seat by a bow-spring 48, and is positively connected with the stem 33 by means of the drive pin 49. The pin 49 makes a close slip fit with a socket in the stem 33 and a free fit with a socket in the valve 46. The valve 46 is enclosed in a cap or housing 51 which is held to the body 12 by a plurality of screws 52. The space within the cap 51 is connected with the main reservoir, the connection being made by two cored ports 53 which are visible in Fig. 3. The space within the bushing 35 is connected with the brake cylinder, but this connection is not illustrated in the drawings.

The inner or right hand end of the stem 33 is counterbored, as shown, to receive a sliding stop 54. This stop is retained and limited in its outward motion by a flanged nut 55, and is yieldingly urged outward by a coil compression spring 56. The stop 54 engages the threaded plug 57 which closes the inner or right hand end of the valve chamber just before port 47 commences to open into slot 44.

The function of the spring 56 is to assist the lapping motion of the piston 29 and slide valve 46. It will be observed that since the space within the bushing 35 is subject to brake cylinder pressure, the valve 46 is held to its seat by the pressure differential between main reservoir pressure and brake cylinder pressure. It follows that the lower brake cylinder pressure is, the higher the effective pressure seating the valve 46. To release the brakes the piston 29 must move to the left to the release position shown in Fig. 1. After the valve 46 has reached lap position the spring 54 ceases to have any effect. Consequently the effective force is the differential of pressures acting on piston 29. If brake cylinder pressure is low, and assuming that the equalizing piston 21 is in release position so that the pressure to the left of piston 29 is atmospheric, the effective pressure differential acting on piston 29 is quite low. Consequently, the movement of the piston 29 under a very low releasing pressure is resisted by abnormally high valve friction at the inlet valve 46.

The purpose of the present invention is to relieve the application piston 29 of the frictional load imposed by the slide valve 46 in the construction just described, when the application portion is shifting from lap to release position. The result is accomplished by substituting a poppet type inlet valve for the slide valve 46.

A further refinement is the use of a duplex poppet valve in which a pilot valve of small area relieves the main poppet valve of seating pressure differential, thus facilitating opening of the valve. A further advantage of the invention is an arrangement by which a strainer structure is substituted in the space formerly occupied by the slide valve and its housing.

Figure 2:
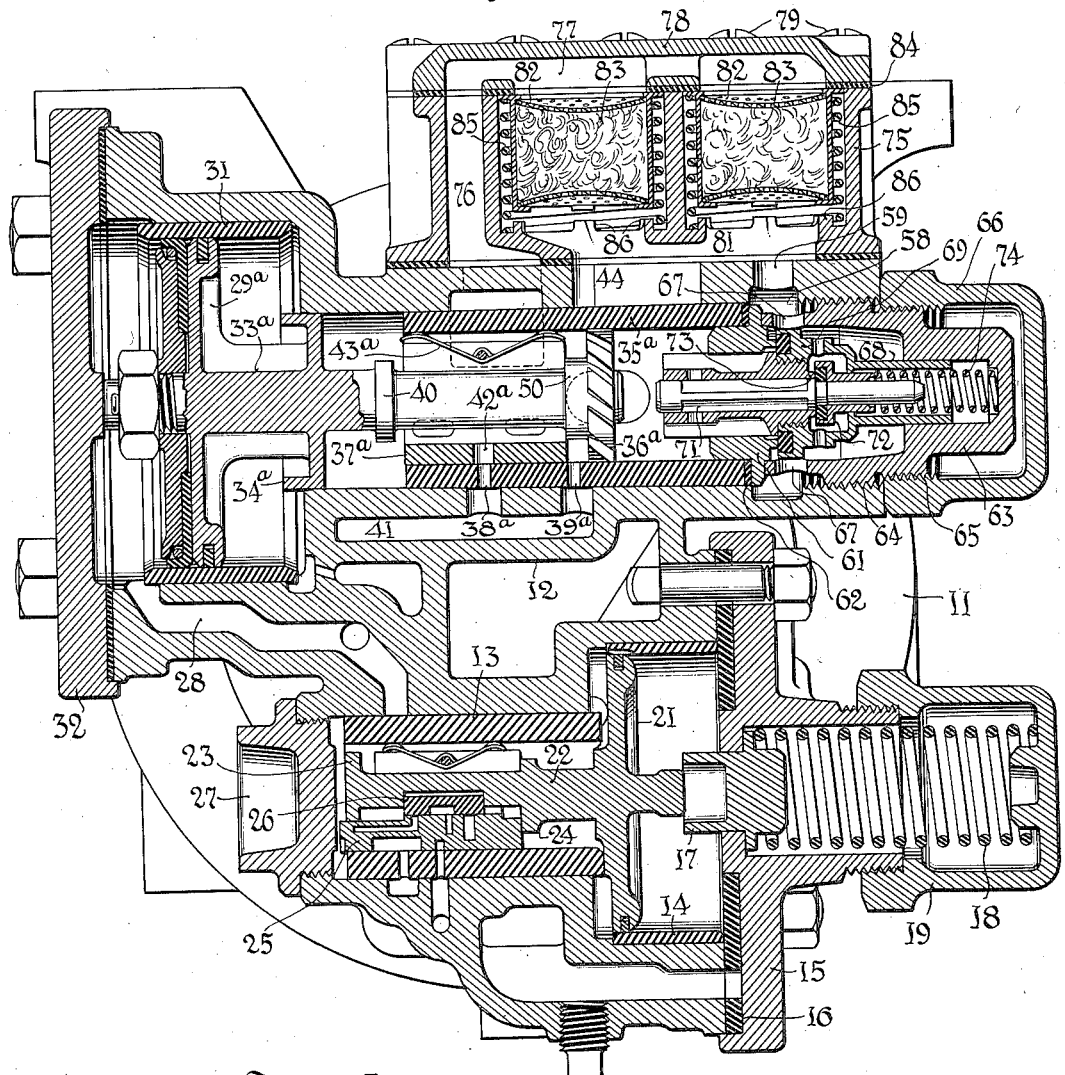
Fig. 2 is a similar section, on a slightly larger scale, showing the same valve after conversion according to the present invention.

Referring now to Fig. 2, it may be stated that the reservoirs and equalizing portion are unchanged, and consequently are indicated by the same reference numerals used in Fig. 1. Further, those parts of the application portion which remain unchanged, are similarly indicated by the reference numerals used on Fig. 1.

To convert the valve of Fig. 1 according to the present invention, the application piston with its exhaust valve and drive pin are removed. The admission valve 46 and its housing 51 are removed. The plug 57 is removed and the bushing 35 is pressed out. The inlet valve seat 45 is machined off flush. A groove 58 is machined in the body 12, as indicated in the drawings, and a port 59 is drilled through the right hand portion of what had been the seat 45. Then a new bushing 35a is pressed into the space formerly occupied by the bushing 35. The bushing 35a is shorter than the bushing 35 and its right hand end is adjacent the groove 58. It completely blanks that portion of slot 44 which is formed in the body 12. It is, however, provided with exhaust ports 38a and 39a, in an exhaust valve seat adapted to receive an exhaust valve 37a which is similar to the valve 37 but has upstanding wings which carry a bow-spring 43a. The bow-spring 43a reacts against the upper side of bushing 35a instead of reacting against the piston stem as in the construction of Fig. 1.

This is a better arrangement, because the piston and stem are freed of all lateral stresses.

The valve 37a is actuated with lost motion by means of a piston 29a having a stem 33a. The stem 33a is shorter than the stem 33 and has a spirally grooved spider or head 36a which works in the bushing 35a and maintains alinement of the stem and piston. Furthermore, the stem 33a is provided with collars 49 and 50 between which the valve 37a is confined with lost motion. This leaves the piston free to rotate in the cylinder and thus insures more even wear.

One or more components of the old piston 29 may be salvaged and embodied in the new piston. Such parts are, the packing ring, cup leather, the follower spring for the cup leather, the follower disk and the nut which clamps the follower disk. The parts will be readily recognized in the drawings.

A valve seat 61 mounted against the inner end of the bushing 35a makes a tight joint therewith by means of an interposed gasket 62. The valve seat is held in place by means of a cup-like member 63 which is threaded at 64 in the body 12, and which is threaded at 65 to receive a sealing cap 66. The member 63 is provided with a series of ports 67 which connect the space within the member with the groove 58. The member 63 is provided with a guideway for the stem or pilot 68 of the main poppet valve 69. This valve has an axial through port in which is guided a fluted pilot 71 of an auxiliary poppet valve 72 which coacts with a seat 73 mounted in the valve 69. A coil compression spring 74 reacts against the end of the member 63 and serves first to urge the pilot valve 72 against its seat and then to urge the main poppet valve 69 against its seat. Both valves are provided with inserted sealing faces of yielding material, as indicated clearly in the drawings.

In the space offered by the removal of the housing 51 there is mounted a housing 75 which is formed with a passage 76 which communicates with both the ports 53 (see Fig. 3) and thence leads to a longitudinal passage 77 formed in a cap 78. The cap 78 is mounted on the housing 75 and the parts are held together by a plurality of screws 79 which enter the tapped holes originally provided for the screws 52. The body 75 is formed with two chambers which are open at their top to the passage 77 and which are open at their lower end to a passage 81 which leads to the port 59.

Mounted in each of these chambers is a combined valve and strainer element constructed in accordance with the invention described and claimed in my copending application Serial No. 610,679, filed May 11, 1932. Each of these units comprises a cylindrical perforate shell 82 filled with any suitable filtering material 83, for example, curled hair. The upper ends of these members 82 seat against the inward projecting portion of a gasket 84 which is interposed between the cap 78 and the housing 75. They are urged into such seating engagement by coil springs 85 which surround the members 82. The effect is to filter air flowing from the main reservoir through the passage 76 to the passage 67. If the filters become clogged they are moved bodily downward until they are arrested by standoff lugs 86. In this way free bypasses are opened around the filter elements which will insure maintained operation even if the filters become clogged.

*Operation*

In making an application the equalizing portion functions to estabish a desired pressure in the application cylinder and this pressure acts on the outer (left hand) side of the piston 29a. The piston moves to the right and unseats the pilot valve 72. The relief of seating pressure on the main valve 69 permits the ready unseating of this valve and pressure builds up within the bushing 35a and consequently within the brake cylinder, until brake cylinder pressure rises to or slightly above equalization with the pressure in the application cylinder. At such time the piston 29a moves outward, allowing the inlet valve to close. If the pressure in the application cylinder be reduced to release the brakes, the piston 29a moves further outward, picking up the valve 37a and moving it to the position to exhaust brake cylinder pressure to atmosphere.

In the modified construction, the inlet valve is not subject to friction developed by unbalanced pressure, and, furthermore, after the inlet valve closes, the application piston can move to open the exhaust valve independently of the inlet valve. Consequently, the application piston is freed of all unnecessary frictional load and moves promptly and certainly to perform its releasing function.

What is claimed is,—

1. The combination with a salvaged distributing valve body for that type of distributing valve in which an admission slide valve is actuated by an application piston through a drive pin which extends through a slot in the body, of a bushing mounted in said body and permanently closing said slot; an admission valve assembly of the poppet type comprising a seat member mounted against the end of said bushing, and coacting poppet valve means, there being in said body a newly formed port arranged to connect with said admission valve assembly; a removable housing connecting said newly formed port with the usual main reservoir ports in the body and occupying space normally occupied by the admission slide valve; removable means for retaining said admission valve assembly in position; an application piston arranged to actuate said poppet type admission valve; and an exhaust valve also actuated by said piston and coacting with ports in said bushing.

2. The combination with a distributing valve body for that type of distributing valve in which an admission slide valve is actuated by an application piston through a drive pin which extends through a slot in the body, of a bushing mounted in said body and closing said slot; an admission valve assembly of the poppet type mounted against the end of said bushing, there being in said body a port formed to connect with said admission valve assembly; a removable housing connecting said port with the usual main reservoir ports in the body and occupying space normally occupied by the admission slide valve; a strainer structure mounted in said removable housing; removable means for retaining said admission valve assembly in position; an application piston arranged to actuate said poppet type admission valve; and an exhaust valve also actuated by said piston and coacting with ports in said bushing.

3. The combination with a distributing valve body for that type of distributing valve in which an admission slide valve is actuated by an application piston through a drive pin which extends through a slot in the body, of a bushing mounted in said body and closing said slot; an admission valve assembly of the poppet type mounted against the end of said bushing, there being in said body a port formed to connect with said admission valve assembly; a removable housing connecting said port with the usual main reservoir ports in the body and occupying space normally occupied by the admission slide valve; a strainer structure including loaded valve means for relieving excess pressure thereon removably mounted in the last-named housing; removable means for retaining said admission valve assembly in position; an application piston arranged to actuate said poppet type admission valve; and an exhaust valve also actuated by said piston and coacting with ports in said bushing.

CHARLES A. CAMPBELL.